United States Patent [19]

Aydin et al.

[11] Patent Number: 4,971,649

[45] Date of Patent: Nov. 20, 1990

[54] LAYING TILES USING A TILE ADHESIVE

[75] Inventors: Oral Aydin, Mannheim; Peter Fickeisen, Dirmstein; Rainer Hummerich, Worms; Hans-Helmut Goertz, Freinsheim, all of Fed. Rep. of Germany

[73] Assignee: BASF Aktiengesellschaft, Ludwigshafen, Fed. Rep. of Germany

[21] Appl. No.: 317,994

[22] Filed: Mar. 2, 1989

[30] Foreign Application Priority Data

Mar. 5, 1988 [DE] Fed. Rep. of Germany ....... 3807235

[51] Int. Cl.$^5$ .............................................. C09J 5/00
[52] U.S. Cl. ................................. 156/327; 52/309.3; 52/390; 52/746; 156/71; 524/377; 524/543; 568/620
[58] Field of Search ............... 156/71, 327; 524/377, 524/543; 568/620; 52/746, 309.3, 390

[56] References Cited

U.S. PATENT DOCUMENTS

| | | |
|---|---|---|
| 2,527,970 | 10/1950 | Jokol ................... 524/377 |
| 3,041,785 | 7/1962 | MacDonald et al. ........... 52/390 |
| 3,238,141 | 3/1966 | Gatza ................... 524/377 |
| 4,381,205 | 4/1983 | Warchol . |
| 4,411,819 | 10/1983 | Panek et al. . |
| 4,649,224 | 3/1987 | Panek et al. . |
| 4,665,239 | 5/1987 | Panek et al. . |

FOREIGN PATENT DOCUMENTS

| | | |
|---|---|---|
| 61822 | 10/1982 | European Pat. Off. . |
| 0237960 | 9/1987 | European Pat. Off. . |
| 2148457 | 4/1973 | Fed. Rep. of Germany . |
| 2070635 | 9/1981 | United Kingdom . |
| 8400361 | 2/1984 | World Int. Prop. O. . |

*Primary Examiner*—John J. Gallagher
*Attorney, Agent, or Firm*—Oblon, Spivak, McClelland, Maier & Neustadt

[57] ABSTRACT

Tiles are laid using a tile adhesive which is based on a polymer dispersion and conventional additives and contains, as a thickener, a compound of the general formula I

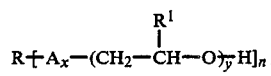

where R is a radical of dihydric to hexahydric alcohol of 2 to 10 carbon atoms, which radical is bonded via oxygen, $R^1$ is alkyl, alkoxymethyl or alkenyloxymethyl or a mixture of these radicals, each having 16 to 30 carbon atoms in the alkyl, alkoxy or alkenyloxy radical, A is —CH$_2$CH$_2$—O— (=EO) alone or as a mixture with

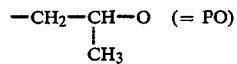

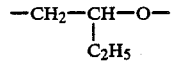

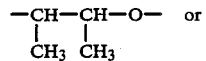

—CH$_2$CH$_2$CH$_2$CH$_2$—O—, where A is not less than 50, preferably not less than 70, mol % of —CH$_2$CH$_2$O—, x is from 12 to 500, y has a mean value (averaged over a large number of molecules) of from 0.3 to 5, preferably from 0.5 to 2, and n is an integer from 2 to 6.

4 Claims, No Drawings

LAYING TILES USING A TILE ADHESIVE

The present invention relates to the laying of tiles using a tile adhesive having improved processing properties.

It has been disclosed (for example in GB 20 70 635 and DE 21 48 457) that polymer dispersions obtained using various monomer combinations, such as vinyl acetate and acrylates and methacrylates with styrene, butadiene, etc., as starting materials can be used as base materials for tile adhesives. However, such adhesive formulations have the disadvantage that they are not water-resistant and are therefore unsuitable for some applications, especially in wet rooms. Since, however, the adhesives based on a dispersion are easier for tile layers to handle than are the cement-based water-resistant tile adhesives, attempts were made to render the dispersion adhesives water-resistant.

Attempts have been made, as described in GB 20 70 635, to render polymer dispersions having carboxyl functions water-resistant through zinc tetrammine complexes.

DE 21 48 457 describes an attempt to make polymer dispersions water-resistant through the incorporated silanol groups.

In addition to the requirements with respect to the water resistance of the adhesives for ceramic linings in the thin-bed method (according to DIN 18,156; Parts 1, 2, 3), it is important in practice to ensure good processibility of the adhesives and adequate sliding behavior, i.e. easy application of the adhesive to the wall without great effort, in conjunction with very little sliding of the freshly bonded tiles.

In order to convert the very low-viscosity dispersions into pasty adhesives for processing, thickeners based on organic and inorganic substances are added to the dispersions, in addition to the conventional additives (fillers, film-forming assistants, dispersants, plasticizers, resins, etc.). Such thickeners are stated in, for example, GB 20 70 635 and 21 48 457, examples being cellulose derivatives, alginates, starch, starch derivatives, polyacrylic acid, salts, silica and bentonite.

Although these additives result in adequate processibility, the water resistance is often adversely affected to such an extent that the tiles fall off after storage in water. Apart from this, the thickeners used to date meet the specifications for sliding behavior according to DIN 18,156, Part 2, 5.2.5 in the case of light-weight tiles (about 210 g, earthenware), but in the processing of heavy tiles (e.g. 950 g tiles) the easy processability is retained but the resistance to sliding is no longer satisfactory.

It is an object of the present invention to modify the rheology of the dispersions usually used for the preparation of tile adhesives, in such, a way that the tile adhesives prepared therefrom not only possess good processibility but also exhibit good sliding behavior in the bonding of heavy tiles. In addition to good processing properties, the additives used for adjusting the rheological properties of the pastes should not adversely affect the water-resistance of the dispersion used but if possible improve it.

We have found that this object is achieved and that polymer dispersions for tile adhesive formulations can be modified by adding a compound of the general formula I

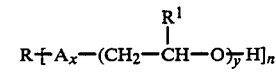

where R is a radical of a dihydric to hexahydric alcohol of 2 to 10 carbon atoms, which radical is bonded via oxygen, $R^1$ is alkyl, alkoxymethyl or alkenyloxymethyl or a mixture of these radicals, each having 16 to 30 carbon atoms in the alkyl, alkoxy or alkenyloxy radical, A is $-CH_2CH_2-O-$ ($=EO$) alone or as a mixture with

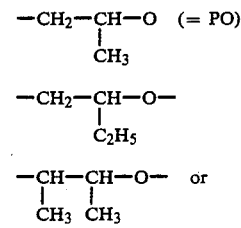

$-CH_2CH_2CH_2CH_2-O-$, where A is not less than 50, preferably not less than 70, mol % of $-CH_2CH_2O-$, x is from 12 to 500, y has a mean value (averaged over a large number of molecules) of from 0.3 to 5, preferably from 0.5 to 2, and n is an integer from 2 to 6, as a thickener, in such a way that their processing properties as tile adhesives are advantageously affected, the water resistance of adhesives according to DIN 18,156, Part 2 (for hydraulically hardening systems) is reached.

Compounds of this type have already been proposed as thickeners for water-based hydraulic fluids (U.S. Pat. Nos. 4,411,819, 4,649,224, and 4,665,239 and WO 84/00361) and for aqueous quenching liquids (U.S. Pat. No. 4,381,205) for quenching hot metals. However, their excellent suitability as thickeners for tile adhesives was not obvious from this.

The thickeners used according to the invention are polyetherpolyols which consist of a linear or branched lower alkylene oxide homopolymer or copolymer whose terminal groups have been reacted with 1,2-alkylene oxides of 18 to 32 carbon atoms or alkyl or alkenyl glycidyl ethers where the alkyl or alkenyl chain is of 16 to 30 carbon atoms. The mean molecular weight is from 1,000 to 75,000.

Such polyetherpolyols are obtained if, as described in EP 61 822 and EP 116 564, a polyhydric alcohol of about 2 to 10 carbon atoms and containing about 2 to 6 hydroxyl groups is reacted with ethylene oxide alone or with ethylene oxide and one or more alkylene oxides of 3 or 4 carbon atoms (in the latter case, the reaction being carried out using a mixture if a random copolymer is desired, and being carried out using the components in succession if a block copolymer is required) and this intermediate is then reacted with not less than 0.3 equivalent (per hydroxyl group) of alkylene oxide having 18 to 32 carbon atoms and a terminal epoxy group or with not less than 0.3 equivalent of an alkyl or alkenyl glycidyl ether where the alkyl or alkenyl radical is of 16 to 30 carbon atoms. The preparation can also be carried out as described in U.S. Pat. No. 4,398,045, by reacting an existing polyalkylene oxide hompolymer or copolymer obtained from $C_2-$ or $C_2-$ and $C_3/C_4-$epoxides with the abovementioned relatively long-chain alkylene oxides or glycidyl ethers.

Dihydric to hexahydric alcohols are those having from 2 to 6 hydroxyl groups. Specifically, they are alkanepolyols, alkenepolyols, alkynepolyols or oligooxyalkylene glycols, each of 2 to 10, preferably 2 to 6, carbon atoms.

Examples of suitable alkanepolyols are ethylene glycol, 1,2- and 1,3-propylene glycol, neopentyl glycol, butane-1,2-diol, butane-1,3-diol, butane-1,4-diol, trimethylolpropane, glycerol, pentaerythritol, 2,3,4,5-hexanetetrol, sorbitol and glucose.

Examples of alkenepolyols are but-2-ene-1,4-diol, hex-2-ene-1,4,6-triol, hexa-1,5-diene-3,4-diol and hept-3-ene-1,2,6,7-tetrol.

Examples of alkynepolyols are but-2-yne-1,4-diol, hex-2-yne-1,4,6-triol and oct-4-yne-1,2,7,8-tetrol.

Examples of oligooxyalkylene glycols are diethylene glycol, triethylene glycol, tetraethylene glycol and dipropylene glycol.

The skeleton of the polyetherpolyol may either be composed of only oxyethylene units or also contain oxyalkylene units of 3 or 4 carbon atoms in an amount of not more than 50, preferably 30, mol %. Corresponding alkylene oxides are, in particular, propylene oxide, as well as 1,2-butylene oxide and 2,3-butylene oxide, and also tetrahydrofuran. The corresponding copolymers may be random or block copolymers. Particularly preferred copolymers are those which contain ethylene oxide and propylene oxide in a weight ratio of 70:30 to 95:5.

The relatively long-chain epoxides of 18 to 32 carbon atoms and glycidyl ethers of 19 to 33 carbon atoms which are incorporated at the chain end are prepared in a conventional manner by olefin oxidation or by reaction of fatty alcohols with epichlorohydrin.

The amount of relatively long-chain 1,2-alkylene oxide or glycidyl ether is in general from 0.5 to 75% by weight, based on the total molecule. The average molar ratio of relatively long-chain epoxide or glycidyl ether to each individual hydroxyl group of the polyfunctional alcohol should be from 0.3 to 5, preferably from 0.5 to 2.

Examples of long-chain 1,2-epoxides are 1,2-epoxyoctadecane, 1,2-epoxyeicosane, 1,2-epoxydocosane, 1,2-epoxytetracosane, 1,2-epoxyhexacosane and 1,2-epoxyoctacosane as well as mixtures of such epoxides which are commercially available.

Examples of alkyl glycidyl ethers are octadecyl, eicosyl, tetracosyl, ceryl, 2-hexyldodecyl and 2-octyldodecyl glycidyl ether.

Examples of alkenyl glycidyl ethers are oleyl glycidyl ether and phytyl glycidyl ether.

Preferred thickeners are polyetherpolyols which have a molecular weight of from 1,000 to 75,000 and are obtained by reacting a bifunctional or trifunctional alcohol with ethylene oxide, if necessary as a mixture with not more than 30% by weight of propylene oxide, and then further reacting the product with one or more 1,2-alkylene oxides of 18 to 32 carbon atoms or with one or more alkyl or alkenyl glycidyl ethers where the alkyl or alkenyl group is of 16 to 30 carbon atoms, in an amount of from 2 to 5 moles per mole of bifunctional or trifunctional alcohol.

The polymers of the polymer dispersions may also be derived from, for example, acrylates and/or methacrylates of straight-chain or branched alkanols of in general from 1 to 10, in particular from 4 to 8, carbon atoms, from vinylaromatic monomers, such as styrene, from vinyl esters of carboxylic acids of 2 to 10, in particular 2 to 4, carbon atoms, preferably vinyl acetate and vinyl propionate, from vinyl and/or vinylidene halides and/or 1,3-diolefins, preferably butadiene. Of particular interest are polymer dispersions having adhesive properties. Polymer dispersions whose polymers are composed of acrylates, in particular of n-butyl, isobutyl and 2-ethylhexyl acrylate, vinyl esters, in particular vinyl acetate, vinyl propionate or vinyl laurate, if necessary as a mixture with one another and/or as a mixture with, for example, ethylene, styrene and butadiene, are therefore particularly suitable. The polymer dispersions contain the polymer in a concentration of in general from 35 to 70, in particular from 40 to 60, % by weight, based on the polymer dispersion.

In contrast to many conventional thickeners, the novel thickeners are used in the entire pH range from 1 to 10, since their effect shows very little dependence on pH. They can be processed from water or aqueous mixtures of water-miscible solvents, such as alcohols or glycols, and from conventional solvents in which the thickeners are soluble, such as esters, ketones, hydrocarbons, plasticizers or liquid resins or from liquid nonionic surfactants, such as fatty alcohol oxyalkylates, alkylphenol oxyalkylates or fatty acid oxyalkylates. Because of the very pronounced thickening effects, it is advantageous to employ about 10% strength thickener solutions.

The amount of thickener of the formula I (100% solids content) in the total formulation is from 0.01 to 5, preferably from 0.05 to 2.0, % by weight. In combination with other thickeners, provided that these do not have a very adverse effect on the water resistance, the amounts used can be substantially lower than the stated ones. The thickeners are preferably used as a solution in water or a combination of water and partially or completely water-miscible organic solvents.

The tile adhesives are prepared by the generally known processes, homogeneous materials being obtained by thoroughly mixing the individual components. In the preparation of the mixtures, it has proven advantageous if the water and the novel thickener are premixed and the dispersion and fillers and any other additives are then added.

EXAMPLES 3 different commercial polymer dispersions were used:

Dispersion A: A 50% strength aqueous dispersion of an acrylate/styrene copolymer Dispersion B: A 50% strength aqueous dispersion of a copolymer of styrene and an acrylate, recommended for tile adhesives Dispersion C: A 50% strength dispersion of a styrene/acrylate copolymer containing carboxyl groups and a zinctetrammine complex Additives: Butyl diglycol acetate (BDGA) Powdered quartz W1 ) from Quarzwerke GmbH Powdered quartz W12 ) 5020 Frechen Alkylphenol with six ethylene oxide units Ammonium polyacrylate 12% strength in water Comparative thickener: Culmina ® MHPC 20 000 PR (Henkel)

1: R=1,1,1-trimethyolpropane radical, bonded via oxygen
$R^1$=H and $CH_3$ in a molar ratio of 87:13
$R^2$=$C_{22}$-$C_{26}$-alkyl
x=120 y=1
n=3

Formulation: 50% strength in BDGA

R=1,1,1-trimethylolpropane radical, bonded via oxygen
$R^1$=H and $CH_3$ in a molar ratio of 87:13
$R^2$=$C_{22}$–$C_{26}$-alkyl x=120
y=1
n=3

Formulation: 50% strength in BDGA

R=1,1,1-trimethylolpropane radical, bonded via oxygen
$R^1$=H and $CH_3$ in a molar ratio of 87:13
$R^2$=$C_{16}$-alkyl
x=120
y=1
n=3

Formulation: 50% strength in BDGA

R=1,1,1-trimethylolpropane radical, bonded via oxygen
$R^1$=H and $CH_3$ in a molar ratio of 87:13
$R^2$=$C_{22}$–$C_{26}$-alkyl
x=120
y=0.85
n=3

Formulation: 50% strength in BDGA

R=1,1,1-trimethylolpropane radical, bonded via oxygen
$R^1$=H and $CH_3$ in a molar ratio of 87:13
$R^2$=$C_{22}$–$C_{26}$-alkyl
x=120
y=1.5
n=3

Formulation: 50% strength in BDGA

R=Ethylene glycol radical, bonded via oxygen
$R^1$=H
$R^2$=$C_{16}$-alkyl
x=150
y=4
n=2

Formulation: Mixture of thickener No. 6+Lutensol AP6 in a weight ratio of 3:1, the entire mixture being 75% strength in water.

TABLE 1

| Tile adhesives: Mixtures of (the numbers indicate the amounts in parts by weight) | | | | | | | | | | | | | |
|---|---|---|---|---|---|---|---|---|---|---|---|---|---|
| Example No. | 1 | 2 | 3 | 4 | 5 | 6 | 7 | 8 | 9 | 10 | 11 | 12 | 13 |
| Water | 15 | 15 | 15 | 15 | 15 | 15 | 15 | 15 | 15 | 15 | 15 | 15 | 15 |
| Culminal MHPC 20000 PR | 1 | — | — | 1 | — | — | 1 | — | — | — | — | — | — |
| Latekoll D solution | — | 5 | — | — | — | — | — | — | — | — | — | — | — |
| Thickener No.1 | — | — | 2.5 | — | 2.5 | — | — | — | — | — | 2.5 | — | — |
| Thickener No. 2 | — | — | — | — | — | 2.5 | — | — | — | — | — | 2.5 | — |
| Thickener No. 3 | — | — | — | — | — | — | — | 2.5 | — | — | — | — | — |
| Thickener No. 4 | — | — | — | — | — | — | — | — | 2.5 | — | — | — | — |
| Thickener No. 5 | — | — | — | — | — | — | — | — | — | 2.5 | — | — | — |
| Thickener No. 6 | — | — | — | — | — | — | — | — | — | — | — | — | 3.0 |
| Butyl diglycol acetate | 1.25 | 1.25 | — | 1.25 | — | — | 1.25 | — | — | — | — | — | — |
| Dispersion A | 25 | 25 | 25 | — | — | — | — | — | — | — | — | — | — |
| Dispersion B | — | — | — | 25 | 25 | 25 | — | — | — | — | — | — | — |
| Dispersion C | — | — | — | — | — | — | 25 | 25 | 25 | 25 | 25 | 25 | 25 |
| Powdered quartz W1 | 33 | 33 | 33 | 33 | 33 | 33 | 33 | 33 | 33 | 33 | 33 | 33 | 33 |
| Powdered quartz W12 | 33 | 33 | 33 | 33 | 33 | 33 | 33 | 33 | 33 | 33 | 33 | 33 | 33 |

The adhesives described in Table 1 were tested according to DIN 18,156.

(a) Processibility:

The processibility was rated during application of the adhesive to a vertical wall, according to the force required in combing the adhesive (8×8×8 mm comb trowel).

1. Very good
2. Good
3. Satisfactory
4. Adequate
5. Poor (difficult to process)

(b) Adhesion to wall, sliding

The adhesives were tested under more severe conditions than those described in DIN 18,156, Part 2, 5.2.5. The sliding behavior was determined using earthenware tiles measuring 20×20 cm (about 960 g) on a vertical wall, instead of using tiles measuring 15×15 cm (about 210 g), in accordance with the DIN specification, the tiles being laid immediately.

(c) The adhesive strengths were determined using a Herion apparatus, according to DIN 18,156, Part 2.

Adhesive strengths:
1. Drying for 7 days: 7 d
2. Drying for 7 days, storage in water for 7 days: 7 d, 7 W
3. Drying for 7 days, storage in water for 21 days: 7 d, 21 W The results are summarized in Table 2.

TABLE 2

| Testing the adhesives according to DIN 18,156 | | | | | | | | | | | | | |
|---|---|---|---|---|---|---|---|---|---|---|---|---|---|
| Example No. | 1* | 2 | 3 | 4* | 5 | 6 | 7* | 8 | 9 | 10 | 11 | 12 | 13 |
| Processibility | 1-2 | 1-2 | 1-2 | 2 | 2 | 2 | 2 | 2-3 | 2 | 1 | 2 | 2 | 2 |
| Adhesion to wall, sliding behavior | s.c. | good | good | s.c. | good | 1 mm | 2 mm | 10 mm | 2 mm | **s.c. | good | 2 mm | 2 mm |
| Adhesive strengths [N/mm] | | | | | | | | | | | | | |
| after 7 d | 1.5 | 1.5 | 0.8 | 1.5 | 0.6 | 0.9 | 1.5 | 1.5 | 1.5 | 1.3 | 1.5 | 1.4 | 1.2 |
| after 7 d, 7 W | 0 | 0 | 0.14 | 0.23 | — | 0.22 | 0 | 0.61 | 0.4 | 0.6 | 0.6 | 0.55 | 0.43 |

TABLE 2-continued

| Testing the adhesives according to DIN 18,156 | | | | | | | | | | | | | |
|---|---|---|---|---|---|---|---|---|---|---|---|---|---|
| after 7 d, 21 W | 0 | 0 | 0.19 | 0.23 | 0.39 | 0.47 | 0 | 0.85 | 0.66 | 0.68 | 0.64 | 0.53 | 0.52 | s.c. = slipped completely
*Comparative Experiment
**Amount of thickener too small
0 = tiles fallen off Table 2 indicates a surprising superiority of the novel tile adhesives over the prior art. The processibility is equally good and the sliding behavior and the water resistance are substantially improved. The actual surprising aspect is that the processing properties are not simultaneously adversely affected. Usually, the requirements for good processibility and good sliding behavior are contradictory ones, so that it is always necessary to make a compromise because it is impossible to obtain very good processibility and very good sliding behavior simultaneously. However, it is precisely this which has been achieved by the invention. It makes it possible to combine good processibility with good sliding behavior. Moreover, the requirements with respect to water resistance are optimally met.

EXAMPLES 14 AND 15

Since the rheology and, in some cases, the water resistance of the pasty dispersion tile adhesives are very dependent on fillers, dispersion C containing the novel thickeners was also tested with another filler combination (test conditions as in Examples 1-13)

|  | Example 14 | Example 15 |
|---|---|---|
| Water | 60 | 60 |
| Thickener No. 1 | 10 | — |
| Thickener No. 2 | — | 10 |
| Dispersion C | 100 | 100 |
| Calcite (finely divided) | 133 | 133 |
| Quartz sand (fine) | 133 | 133 |
| Processibility | 1 | 1 |
| Adhesion to wall and sliding behavior | Good | 1 mm |
| Adhesive strength [N/mm] | | |
| 7 d | 1.5 | 1.5 |
| 7 d, 21 W | 0.7 | 0.65 |

We claim:

1. A process for laying tiles, in which an aqueous adhesive which is based on a polymer dispersion and, in addition to the dispersion as a binder, contains conventional additives is applied between the tiles and the substrate, wherein the adhesive used has been thickened with a compound of the formula I $$R\mathord{+}A_x-(CH_2-\underset{R^1}{CH}-O)_y H]_n \qquad I$$

where R is a radical of a dihydric to hexahydric alcohol of 2 to 10 carbon atoms, which radical is bonded via oxygen, $R^1$ is alkyl, alkoxymethyl or alkenyloxymethyl or a mixture of these radicals, each having 16 to 30 carbon atoms in the alkyl, alkoxy or alkenyloxy radical, A is $-CH_2CH_2-O-$ (=EO) alone or as a mixture with $$-CH_2-\underset{CH_3}{CH}-O- \quad (=PO)$$

$$-CH_2-\underset{C_2H_5}{CH}-O-$$

$$-\underset{CH_3}{CH}-\underset{CH_3}{CH}-O- \quad \text{or}$$

$-CH_2CH_2CH_2CH_2-O-$, where A is not less than 50 mol % of $-CH_2CH_2O-$, x is from 12 to 500, y has a mean value of from 0.3 to 5 and n is an integer from 2 to 6.

2. A process as claimed in claim 1, wherein the adhesive contains from 0.01 to 5% by weight, based on the total material, of one or more compounds of the formula I.

3. A process as claimed in claim 1, wherein the compound of formula I is a polyetherpolyol having a molecular weight of from 1,000 to 75,000.

4. A process as claimed in claim 1, wherein the adhesive contains from 0.05 to 2.0% by weight, based on the total material, of one or more compounds of the formula I.

* * * * *